Figures 1, 2:
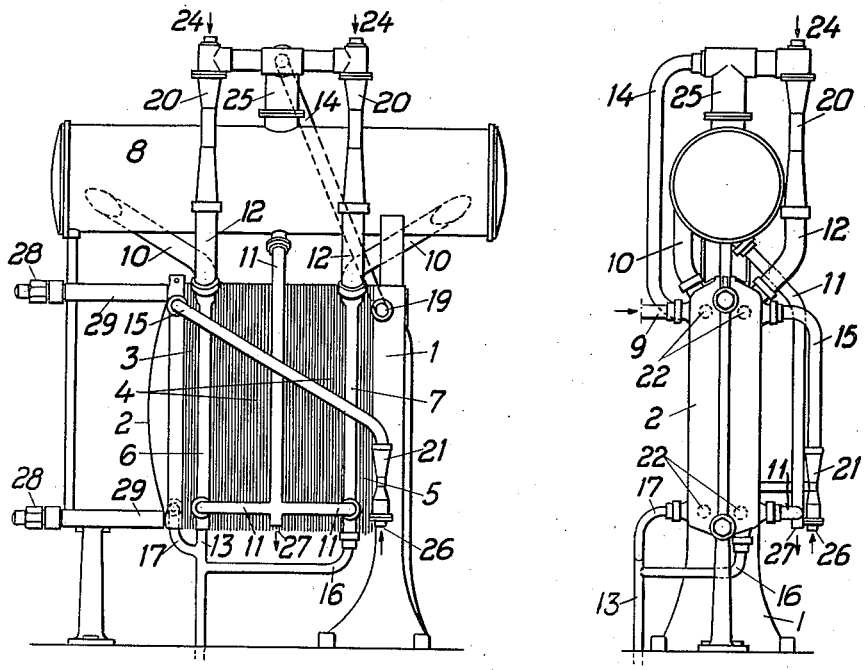

Inventor
Johannes Valdemar Mårten Risberg
By Davis Hoyle & Faithfull
Attorneys

Patented July 31, 1951

2,562,739

UNITED STATES PATENT OFFICE 2,562,739

EVAPORATING APPARATUS

Johannes Valdemar Mårten Risberg, Ostertalje, Sweden, assignor to Aktiebolaget Separator, Stockholm, Sweden, a corporation of Sweden Application January 2, 1948, Serial No. 314
In Sweden May 31, 1941

Section 1, Public Law 690, August 8, 1946
Patent expires May 31, 1961

5 Claims. (Cl. 159—24)

The invention relates to an improved apparatus for evaporating liquid from whey and other foodstuffs containing liquids.

In conventional evaporating apparatus for this purpose, heat is supplied to the liquid in a tube battery, whereupon the treated liquid is fed to a receptacle in which the vapor generated by the supplied heat is evaporated. The liquid is then reconducted to the heating battery in which a fresh amount of heat is supplied, and so on. The liquid is thus caused to circulate between the heating battery and the receptacle.

The conventional apparatus has, however, certain inconveniences. For example, the battery requires considerable space, as its tubing has a rather large volume. Furthermore, it is difficult to obtain access to the tubes for cleaning.

An object of the present invention, therefore, is to provide an improved evaporating apparatus for the above-mentioned purpose, in which these inconveniences are avoided.

According to the invention, heat is supplied to the liquid in a plate type heater of the kind generally used in dairies. The heating arrangement thus comprises a plurality of juxtaposed plates between which tight joints are established by packings located at the plate rims. Every second space between the plates is occupied by the liquid under treatment, while the other alternate spaces are occupied by the heating agent or water vapor. This arrangement has the advantage that the evaporating apparatus is more compact, and the plates may be easily disassembled for cleaning.

As a considerable amount of heat is consumed in the evaporating operation in changing the surplus water to steam, the evaporation is often effected in such a manner as to enable recovery of part of the heat present in the evaporated steam. For this purpose, the evaporated steam is compressed, for example, by one or more steam jet compressors, to a pressure (with ensuing rise of temperature) high enough to enable the regenerated steam to be utilized as heating steam. The best conditions for this procedure are obtained when the evaporation is effected under vacuum, in which case the plant must be provided with a condenser. In this case, it is also necessary to have a preheater for heating the liquid to the temperature at which the evaporating takes place, and the installation will therefore comprise three separate heat exchangers, that is, the above-mentioned preheater, a heater, and a condenser. In the prior installations, the heat exchangers consist of such separate apparatus, which render the installation quite expensive and bulky.

According to the present invention, in addition to the heating section proper, in which heat is supplied to the liquid under treatment for the purpose of evaporating water, the same plate apparatus may be provided with a set of plates for condensing part of the steam evaporated in the receptacle, and, if required, with another set for preheating the liquid.

Figure 3:
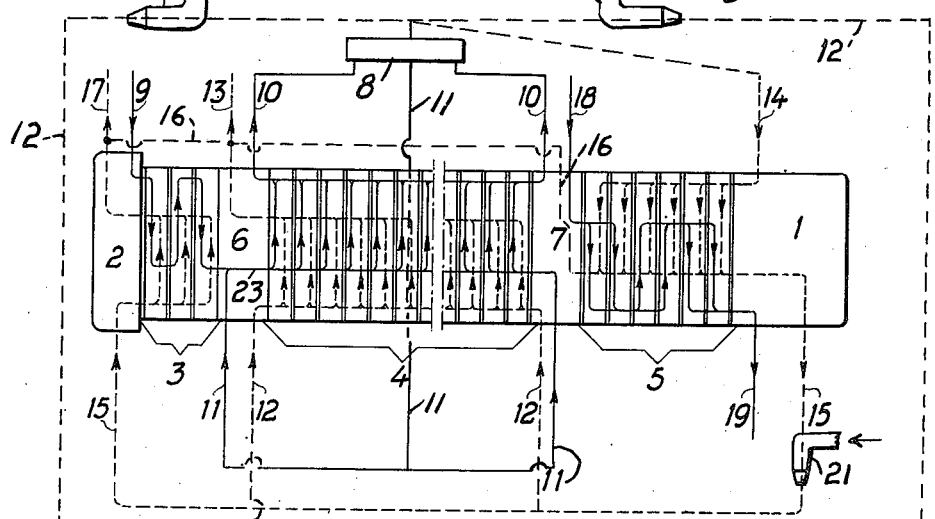

The accompanying drawing illustrates, by way of example, an evaporating apparatus arranged according to the invention, for treating whey or the like. In the drawing, Fig. 1 is a front elevational view and Fig. 2 a side elevational view of the apparatus; and Fig. 3 is a schematic view showing the coupling of the various sections of the plate apparatus.

The apparatus comprises a frame 1 and a pressure plate 2, between which are three groups of plates, constituting a preheater 3, a heater 4 and a condenser 5, these three plate groups being separated by two connecting plates 6 and 7. The connecting plates 6 and 7, like the frame 1 and the pressure plate 2, are provided with tube nipples through which the channel systems of plates are connected to pipe lines 9, 10 and 11 for whey, steam pipe lines 12, 14 and 15, condensate pipe lines 13, 16 and 17, and cooling water pipe lines 18 and 19, and also to the steam evaporating receptacle 8 and the ejectors 20 and 21, by which the evaporated steam is compressed or the apparatus is evacuated, respectively.

The heat exchange plates 3, 4 and 5 are of the same shape as the pressure plate 2 and are provided with the usual openings 22 at their four corners. These openings, when the plates are assembled, form separate distributing channels from which the whey, and the steam and cooling water, respectively, are fed to and from the channel systems on one side or the other of the plates, as illustrated in the coupling diagram in Fig. 3, in which the various conduits are designated by numerals.

The apparatus operates in the following manner. The thin cold whey enters through pipe 9, flows consecutively through the series-coupled spaces between the plates of the preheater 3, thereby assuming the same temperature as that prevailing in the heater 4, and passes on to the latter through channel 23 in the connecting plate 6. The already partly evaporated whey from receptable 8 enters heater 4 (in which the spaces of each of the two groups of alternate spaces between the plates are coupled in parallel) from the receptacle 8 through tubes 11 and the distributing openings 22 near the lower right corners of the plates (Fig. 2), rises at the same time between the plates 4 to the collecting openings 22 near the upper left corners of the plates (Fig. 2), and proceeds from there through the two tubes 10 into the receptacle 8. In the receptacle 8, part of the water content of the whey is evaporated, whereupon the whey is returned to the heater plates 4 through pipes 11 and is thus circulated continuously during the treatment. The steam is supplied through pipes 24 in the form of high pressure steam, which is expanded in the ejectors 20 by nozzles of suitable shape, thereby causing the steam evaporating from receptacle 8 to be sucked through pipe 25. The steam is thus compressed to a pressure and corresponding temperature which is sufficiently higher than the temperature in the heater to cause transfer of the heat of the steam to the whey. The condensate from preheater 3, heater 4 and condenser 5 is discharged through pipes 17, 13 and 16, respectively.

As a result, both steam and cooling water are saved. However, heat must be conducted off, by means of cooling water, in an amount corresponding to the supply of high pressure steam. This is effected in the condenser section 5, which communicates with the receptacle 8 through steam pipe 14. The cooling water is supplied through pipe 18, flows through the plates 5 which, for example, may be coupled in pairs in three series, as shown, and finally discharged through pipe 19. With a view to facilitating the discharge of the condensed water, all the plates 5 are coupled in parallel on the steam side, as shown. The condensate discharges through pipe 16 and is then mixed in pipes 13 and 17 with condensate arriving from heater 4 and preheater 3, respectively (Fig. 1). The apparatus is evacuated by means of the ejector 21 connected to pipe 15 and at 26 receiving high pressure steam from the same pipe as the two steam jet compressors 20. The steam thus used is further utilized for preheating the whey by being fed into the preheater 3 at pipe 15.

When the evaporation is completed, the whey is drawn off at 27 (Fig. 2), or pumped off if a continuous discharge is desired when the apparatus is under vacuum.

As compared with prior evaporating apparatus, the new apparatus has several advantages. For example, the cleaning of the heat transmitting surfaces is a relatively simple procedure. Before the cleaning, the nuts 28 (Fig. 1) are unscrewed and the spacing pieces 29 removed, whereupon the pressure plate 2 is moved to the left. The plates may now be separated, so that they become easily accessible for cleaning.

The construction of the new apparatus is also more compact than in prior apparatus for the same purpose, and much less material is required, which is important when the heating surfaces are made of stainless steel, as is necessary when food products are to be treated. Finally, the opportunities for recovering heat are increased due to the more efficient heat transmission obtained with a plate apparatus, as compared with the prior systems. Owing to this improvement of the heat transmission it is not necessary to compress the evaporated steam to the extent which was formerly required in order to adapt it for use as heating steam.

It will be understood that due to the evaporation in receptacle 8, the liquid leaving the receptacle through pipe 11 will have a higher specific gravity than the liquid entering it from the heat exchange apparatus through pipes 10. Accordingly, by locating the receptacle 8 above the heat exchange apparatus, the liquid undergoing evaporation will circulate between the receptacle and the heat exchange plates by virtue of this difference in specific gravities, so that a circulating pump is unnecessary. It will also be understood that the arrangement of the pipes 10 and 11 may be reversed if desired, so that pipe 11 leads from the outlets at the top of heater 4 to the central portion of the evaporator 8, while pipes 10 lead from the end portions of the evaporator 8 to the inlets at the bottom of heater 4.

I claim:

1. Apparatus for evaporating whey and other liquids containing nutrients, which comprises a plurality of generally vertical, spaced, heat-transmitting plates assembled to form a heating set, the generally vertical spaces between adjacent plates being sealed along the plate rims, one group of said generally vertical spaces inter-communicating to form liquid channels for the liquid to be evaporated, and another group of said spaces inter-communicating to form passages for a heating medium adapted to heat the liquid through the plates, an evaporation receptacle remote from said spaces and in which liquid heated in said channels is evaporated, a discharge pipe leading to the lower portions of said liquid channels from the lower portion of the evaporation receptacle, a supply pipe leading from the upper portions of said liquid channels to the evaporation receptacle, a preheating set of spaced heat-transmitting plates forming preheating channels for said liquid and also forming, separately from but adjacent to said preheating channels, passages for a preheating medium, an inlet pipe connected to said liquid preheating channels for supplying thereto fresh liquid to be evaporated, a duct connecting said last liquid channels to said first liquid channels, and means for supplying another heating medium from the evaporation space to said last receptacle to said last passages to preheat said liquid before it passes through the duct to the liquid channels in said heating set.

2. Apparatus for evaporating whey and other liquids containing nutrients, which comprises a plurality of generally vertical, spaced, heat-transmitting plates assembled to form a heating set, the generally vertical spaces between adjacent plates being sealed along the plate rims, one group of said generally vertical spaces inter-communicating to form liquid channels for the liquid to be evaporated, and another group of said spaces inter-communicating to form passages for a heating medium adapted to heat the liquid through the plates, an evaporation receptacle remote from said spaces and in which liquid heated in said channels is evaporated, a discharge pipe leading to the lower portions of said liquid channels from the lower portion of the evaporation receptacle, a supply pipe leading from the upper portions of said liquid channels to the evaporation receptacle, a condensing set of spaced heat-transmitting plates forming a path for a cooling medium and also forming, separately from but adjacent to said path, a vapor and condensate path, and a duct for conducting to said last path, vapor from the evaporation space of said receptacle.

3. Apparatus for evaporating whey and other liquids containing nutrients, which comprises a plurality of generally vertical, spaced, heat-transmitting plates assembled to form a heating set, the generally vertical spaces between adjacent plates being sealed along the plate rims, one group of said generally vertical spaces inter-communicating to form liquid channels for the liquid to be evaporated, and another group of said spaces inter-communicating to form passages for a heating medium adapted to heat the liquid through the plates, an evaporation receptacle remote from said spaces and in which liquid heated in said channels is evaporated, a discharge pipe leading to the lower portions of said liquid channels from the lower portion of the evaporation receptacle, a supply pipe leading from the upper portions of said liquid channels to the evaporation receptacle, a preheating set of spaced heat-transmitting plates forming preheating channels for said liquid and also forming, separately from but adjacent to said preheating channels, passages for a preheating medium, an inlet pipe connected to said liquid preheating channels for supplying thereto fresh liquid to be evaporated, a duct connecting said preheating liquid channels to said first liquid heating channels, a condensing set of spaced heat-transmitting plates forming a path for a cooling medium and also forming, separately from but adjacent to said path, a vapor and condensate path, a duct for conducting to said last path, vapor from the evaporation space of said receptacle, a steam ejector connected to said last path for evacuating the same, and a duct for conducting steam from the ejector to said passages in the preheating set.

4. Apparatus for evaporating whey and other liquids containing nutrients, which comprises a plurality of generally vertical, spaced, heat-transmitting plates assembled to form a heating set, the generally vertical spaces between adjacent plates being sealed along the plate rims, one group of said generally vertical spaces inter-communicating to form liquid channels for the liquid to be evaporated, and another group of said spaces inter-communicating to form passages for a heating medium adapted to heat the liquid through the plates, an evaporation receptacle remote from said spaces and in which liquid heated in said channels is evaporated, a discharge pipe leading to the lower portions of said liquid channels from the lower portion of the evaporation receptacle, a supply pipe leading from the upper portions of said liquid channels to the evaporation receptacle, and a pipe line for conducting steam from the evaporation space of said receptacle to said passages for the heating medium in the heating set.

5. Apparatus according to claim 4, comprising also a steam ejector in said pipe line for inducing flow of steam from the receptacle to said passages.

JOHANNES VALDEMAR
MÅRTEN RISBERG.

REFERENCES CITED

The following references are of record in the file of this patent:

UNITED STATES PATENTS

| Number | Name | Date |
|---|---|---|
| 339,383 | Cooper | Apr. 6, 1886 |
| 607,284 | Schmidt | July 12, 1898 |
| 1,200,996 | Soderlund et al. | Oct. 10, 1916 |
| 1,213,596 | De Baufre | Jan. 23, 1917 |
| 1,390,677 | De Baufre | Sept. 13, 1921 |
| 2,000,138 | Kuhner | May 7, 1935 |
| 2,076,597 | Robinson et al. | Apr. 13, 1937 |
| 2,314,966 | Astle | Mar. 30, 1943 |
| 2,379,519 | Hall | July 3, 1945 |
| 2,392,021 | Wildermuth | Jan. 1, 1946 |
| 2,440,173 | Henszey | Apr. 20, 1948 |

FOREIGN PATENTS

| Number | Country | Date |
|---|---|---|
| 132,893 | Great Britain | Oct. 1, 1919 |
| 446,587 | Great Britain | May 4, 1936 |